US012337343B2

(12) United States Patent
Bieniek et al.

(10) Patent No.: US 12,337,343 B2
(45) Date of Patent: Jun. 24, 2025

(54) METHOD FOR PRODUCING A DECORATIVE PART

(71) Applicant: JOYSONQUIN Automotive Systems GmbH, Rutesheim (DE)

(72) Inventors: Klaus Bieniek, Muhlacker (DE); Muamet Sadiku, Stuttgart (DE)

(73) Assignee: JOYSONQUIN AUTOMOTIVE SYSTEMS GMBH, Rutesheim (DE)

( * ) Notice: Subject to any disclaimer, the term of this patent is extended or adjusted under 35 U.S.C. 154(b) by 284 days.

(21) Appl. No.: 18/077,365

(22) Filed: Dec. 8, 2022

(65) Prior Publication Data

US 2023/0191445 A1 Jun. 22, 2023

(30) Foreign Application Priority Data

Dec. 16, 2021 (DE) ......................... 102021133458.6

(51) Int. Cl.
*B05D 1/02* (2006.01)

(52) U.S. Cl.
CPC ..................................... *B05D 1/02* (2013.01)

(58) Field of Classification Search
CPC ........................................................ B05D 1/02
See application file for complete search history.

(56) References Cited

U.S. PATENT DOCUMENTS

2013/0284391 A1* 10/2013 Brinkmann ............ B05D 3/002 427/424
2019/0185693 A1 6/2019 Umebayashi et al.
2020/0269568 A1* 8/2020 Lewis .................. B41J 2/04508
2020/0369892 A1 11/2020 De Rossi et al.
2021/0213890 A1 7/2021 Diehl et al.
2021/0387581 A1 12/2021 Bieniek et al.

FOREIGN PATENT DOCUMENTS

| | | | |
|---|---|---|---|
| CN | 113103966 | | 7/2021 |
| DE | 102009053501 | * | 1/2011 |
| DE | 102017008457 | | 3/2019 |
| DE | 202020105779 | | 6/2021 |
| EP | 2298528 | * | 3/2011 |
| EP | 3521386 | | 8/2019 |
| JP | 2011-056362 | | 3/2011 |
| JP | 2016-068051 | | 5/2016 |

OTHER PUBLICATIONS

Search Report from corresponding German Application No. 10 2021 133 458.6 dated Jun. 2, 2022; 5 pages.
Action dated Aug. 17, 2023 in counterpart Chinese patent application No. 202211627312.6; 9 pages.

* cited by examiner

*Primary Examiner* — Nathan T Leong
(74) *Attorney, Agent, or Firm* — Fattibene and Fattibene, LLC; Paul A. Fattibene

(57) ABSTRACT

A method for producing a decorative part with a cover layer, the method comprising the following steps: providing a molded part having an installation side and a visible side, wherein the molded part comprises a substrate layer on the installation side and a decorative layer on the visible side, and applying a coating material to the visible side of the molded part to form the cover layer. In order to reduce the consumption of coating material, the coating material is applied by a print head.

19 Claims, No Drawings

METHOD FOR PRODUCING A DECORATIVE PART

FIELD OF THE INVENTION

The invention relates to a method for producing a decorative part with a cover layer, in particular a decorative part for a vehicle interior, which comprises a visible side with a decorative layer and an installation side with a substrate layer, wherein a cover layer is applied to the decorative layer.

BACKGROUND OF THE INVENTION

Decorative parts, as used in particular in the interiors of motor vehicles, are molded parts that generally have a substrate layer and a decorative layer applied to the substrate layer. The decorative layer is arranged on the side of the decorative part facing the user and thus forms the so-called visible side of the decorative part. The opposite side of the decorative part is formed by the substrate layer and is referred to as the installation side. The substrate layer gives the decorative part the necessary dimensional stability and is provided for fastening the decorative part.

Decorative parts must meet high requirements in terms of their visual and haptic quality as well as dimensional accuracy and resistance to environmental influences. For this purpose, the decorative layer is usually provided with a protective transparent cover layer.

A method for producing a decorative part with a transparent cover layer is disclosed, for example, in EP 2 298 528 A1. Here, a decorative layer is laminated with a transparent film on its side facing the visible side and with a barrier layer on its side facing the installation side. The laminated decorative layer is formed into a preform which is then overmolded with a transparent plastic to form the cover layer and back injection molded with a load-bearing plastic to form the substrate. A decorative part is formed in which a transparent film is arranged between the cover layer and the decorative layer and in which a barrier layer is arranged between the substrate and the decorative layer. The transparent film is made, for example, of a thermoplastic, in particular polycarbonate (PC), polymethyl methacrylate (PMMA), polyvinyl butyral (PVB), thermoplastic polyurethane (TPU), or a composite of these materials. The cover layer is made of an injection moldable plastic, in particular polymethyl methacrylate (PMMA).

This method has the disadvantage that the production of the cover layer by injection molding requires the use of an injection-moldable plastic and is therefore not suitable for all types of coating materials.

From DE 10 2009 053 501 A1, a polysilazane-containing coating for a motor vehicle component is known. This is applied, for example, with the aid of a microfiber cloth or a sponge.

A disadvantage of this method is the fact that application with the aid of a cloth or sponge is complex and does not allow a high throughput. In addition, the consumption of coating material is increased, since part of the coating material remains in the cloth or sponge.

SUMMARY OF THE INVENTION

The present invention is based on the problem of providing an improved method for producing a decorative part with a cover layer. The method is intended to be particularly suitable for the production of decorative parts in large quantities. Furthermore, the consumption of coating material is to be minimized. Finally, the method is intended to be suitable in particular for coating decorative parts with polysilazane- and polysiloxane-containing coating materials.

This problem is solved by a method for producing a decorative part with a cover layer, the method comprising the following steps:

providing a molded part having an installation side and a visible side, wherein the molded part comprises a substrate layer on the installation side and a decorative layer on the visible side; and applying a coating material to the visible side of the molded part to form the cover layer, wherein the coating material is applied by a print head.

The method is characterized in particular in that the coating material is applied by a print head. By using a print head, the coating material can be applied to the decorative part in a targeted manner. The coating material used is deposited almost completely on the decorative part, so that only slight losses of coating material occur. The method can therefore minimize the amount of coating material used and is extremely economical. In addition, the print head can also be used to apply coating materials that are not suitable for processing by injection molding. Finally, the coating material thickness can be adjusted to a few micrometers by using a print head, so that extremely thin but uniform coatings can be generated.

A print head, as defined in the present invention, is a device for applying a coating material that produces one or more targeted jets of the coating material. This feature distinguishes print heads from other application devices, such as rotary atomizers, which produce a spray of the coating material. In particular, the print head may function in the manner of an inkjet printer to produce a coating material jet. The coating material jet may be a continuous jet or a droplet jet. By having the print head generate a targeted coating material jet, the coating material can be applied with pinpoint accuracy and substantially no loss.

DETAILED DESCRIPTION OF THE PREFERRED EMBODIMENTS

In a preferred embodiment, the print head generates a droplet jet. In this way, individual droplets of the coating material can be applied to the decorative part with high spatial precision.

For this purpose, the print head has a device for generating a droplet jet. In particular, this is a piezoelectrically controlled device. With the device, a vibration can be coupled into a continuous coating material jet, so that the coating material jet breaks up into droplets. In addition to using a piezoelectric device, it is also conceivable that the droplet jet is generated by coupling ultrasound or an air jet.

In a preferred embodiment, the print head is operated by the drop-on-demand method or the continuous-jet method. For this purpose, the print head preferably has a piezoelectric control unit for generating coating droplets. In the drop-on-demand method, individual droplets of coating material are ejected from the print head in response to an electrical pulse. In the continuous-jet method, a droplet jet is generated. The droplet rate, i.e. the number of droplets emitted per unit time, is determined by the pulse frequency of the electrical control signal.

In a particularly preferred embodiment, the print head generates a droplet jet with an average droplet volume of 1 pl to 300 pl (1 to 300 picoliters) and a droplet rate of 1 kHz to 200 kHz.

The print head has at least one nozzle for generating the coating material jet. The coating material jet generated by the nozzle has an extremely small scattering angle. Preferably, the scattering angle of the coating material jet is less than 30°, preferably less than 20°, particularly preferably less than 10°.

In a preferred embodiment, the print head has multiple nozzles for generating multiple coating material jets. For example, a single print head may have from 2 to 6000 nozzles, each of which generates a coating material jet. The jets generated by the individual nozzles are preferably aligned essentially parallel. Preferably, the nozzles of a print head can be controlled individually or in groups. For example, the droplet rate, droplet volume or spray rate (i.e. the volume of liquid delivered per time unit) of individual nozzles or individual nozzle groups can be set and varied independently of one another in this way.

In a preferred embodiment, the print head has a piezoelectric device for generating a droplet jet using the drop-on-demand method. Particularly preferably, the print head in this embodiment generates a droplet jet with an average droplet volume of 1 pl to 300 pl and a droplet rate of 1 kHz to 200 kHz and has 2 to 6000 nozzles.

The method according to the invention is not limited to the use of a single print head. It is also possible to apply the coating material by means of several print heads. For example, several print heads can be arranged in such a way that they can simultaneously coat the entire surface of the molded part to be coated.

In a preferred embodiment, the print head or heads are moved relative to the molded part when the coating material is applied, so that the coating material can be applied to several areas of the molded part. In this case, both the print head and the molded part can be arranged in a stationary or movable manner. In this way, it is possible to coat the entire surface of the molded part to be coated uniformly with a single print head or a few print heads.

The print head(s) can be operated in the multi-pass or single-pass method when applying the coating material. In the multi-pass method, a print head is guided several times over the molded part to be coated in order to apply the coating material. A web of the coating material is applied with each pass. In the single-pass method, a print head is guided only once over the molded part to be coated in order to apply one web of the coating material.

If only one single print head is used, it preferably operates in the multi-pass method. In a preferred embodiment, a plurality of print heads is used, each of which operates in the single-pass method.

In a preferred embodiment, the print head and/or the molded part are each attached to a movable robot arm during application of the coating material. In this way, the print head and the molded part can be moved relative to each other. The robot arm may be a fully automatically controlled robot arm. However, the term robotic arm is not intended to be limited to fully automatic control. It is also possible for the robotic arm to be controlled by a human operator.

Preferably, the robot arm has three degrees of freedom (3-axis robot), particularly preferably six degrees of freedom (6-axis robot). A 3-axis robot can perform either a translation in the three spatial directions or a rotation around the three spatial axes. A 6-axis robot can perform both a translation in the three spatial directions or a rotation around the three spatial axes.

In a preferred embodiment, the print head is mounted on a robot arm and can be moved relative to the molded part by means of the robot arm. In a preferred embodiment, multiple print heads are used that are mounted together on a robotic arm. Preferably, this is a 6-axis robot. The three-dimensional arrangement of the multiple print heads is preferably adapted to the geometry of the molded part so that, for example, the print heads can be guided at a uniform distance from the surface of the molded part. Preferably, the print heads in this case operate using the single-pass method.

In one embodiment, the molded part is held by a robot arm, preferably a 3-axis robot, particularly preferably a 6-axis robot. The robot arm preferably has suction cups for holding the molded part, whereby damage to the molded part and in particular scratches on the surface of the molded part can be avoided. However, it is also possible to attach the molded part to the robot arm in other ways, for example via a clamping device. In this embodiment, the print head can be stationary, with the molded part being moved relative to the print head by the robot arm. It is also possible to arrange the print head movably in this embodiment. In this way, the most degrees of freedom are available for the relative alignment of the print head and the molded part.

The coating material according to the invention is preferably a scratch-resistant, transparent paint.

The coating material preferably comprises at least one organic polymer. For example, the coating material may comprise polymethyl (meth)acrylate, polyalkyl (meth)acrylate, polycarbonate, polyurethane, polyurethane acrylate, silicone acrylate, cellulose ester, cellulose ether, polyester, polyether, epoxy resin, polysilazane, polysiloxane, and mixtures and/or derivatives thereof.

In one embodiment, the coating material contains a mixture of modified silicic acid esters in the form of nanoparticles with acrylates or acrylate derivatives.

In a preferred embodiment, the coating material contains polysiloxane and/or polysilazane. These coating materials have proved to be particularly preferred, since they are characterized by excellent mechanical resistance and transparency. In addition, they can be processed very well by the method according to the invention.

In particular, polyorganosiloxanes are used as polysiloxanes, i.e. polymers in which silicon atoms are linked to one another via oxygen atoms and the silicon atoms are additionally substituted with one or more hydrocarbon radicals. The preferred polysiloxane may, for example, be substituted with alkyl groups, alkenyl groups, aryl groups and/or alkoxy groups. The alkyl groups are preferably linear or branched alkyl groups with 1 to 12 carbon atoms, preferably 1 to 8 carbon atoms, further preferably 1 to 6 carbon atoms, particularly preferably methyl, ethyl, n-propyl or iso-propyl groups. The alkenyl groups are preferably linear or branched alkenyl groups having 2 to 12 carbon atoms, more preferably 2 to 8 carbon atoms. Preferably, they are vinyl groups. The aryl groups preferably comprise 6 to 19 carbon atoms, preferably 6 to 13 carbon atoms. Preferably, they are benzyl or phenyl groups. The alkoxy groups are preferably linear or branched alkoxy groups having 1 to 12 carbon atoms, preferably 1 to 8 carbon atoms, more preferably 1 to 6 carbon atoms. Particularly preferred are methoxy, ethoxy, n-propoxy or iso-propoxy groups. The alkyl groups, alkenyl groups, aryl groups and alkoxy groups may be substituted with one or more halogen atoms, in particular with fluorine atoms.

Particularly preferred substituents are alkyl and alkoxy groups, especially methyl, ethyl, n-propyl, iso-propyl, methoxy, ethoxy, n-propoxy and iso-propoxy groups.

The polysiloxane can be substituted with one type of hydrocarbon radical or a mixture of different hydrocarbon radicals. Mixtures of differently substituted polysiloxanes can also be used.

Linear, cyclic, branched and/or crosslinked polysiloxanes can be used. Crosslinked polysiloxanes are particularly preferred. Mixtures of said polysiloxanes may also be used. Preferably, the polysiloxane composition comprises at least one crosslinked polysiloxane.

In a preferred embodiment, crosslinked alkyl-substituted polysiloxanes, in particular crosslinked methyl-substituted polysiloxanes, are used.

In a further preferred embodiment, crosslinked alkyl- and/or alkoxy-substituted polysiloxanes are used, in particular crosslinked polysiloxanes substituted with methyl, ethyl, n-propyl, iso-propyl, methoxy, ethoxy, n-propoxy and/or iso-propoxy groups. Cross-linked, alkyl- and alkoxy-substituted polysiloxanes are also referred to as silicic acid ester-modified polysiloxane resins in the context of the present invention.

The polysiloxanes are preferably used as colloids, particularly preferably in the form of nanoparticles.

The polysiloxane preferably has a weight average molecular weight of 300 to 100,000 g/mol, preferably 500 to 30,000 g/mol, most preferably 750 to 10,000 g/mol. The weight average molecular weight can be determined, in particular, by gel permeation chromatography using polystyrene standards.

The polysilazane used may be a perhydropolysilazane (inorganic polysilazane), an organopolysilazane (organic polysilazane) or a mixture of different polysilazanes. At least one organopolysilazane is particularly preferred.

Suitable polysilazanes are commercially available under the trademark Durazane, for example. Inorganic polysilazanes are available under the Durazane 2000 product range, organic polysilazanes under the Durazane 1000 product range.

Organic polysilazanes, like the polysiloxanes, can be modified with the organic groups described above. Methyl- and/or methylvinyl-modified organopolysilazanes are used in particular as organic polysilazanes.

Perhydropolysilazanes in particular form a carbon-free, glassy silicon oxide network during curing, which exhibits excellent surface properties.

Preferably, the polysilazane has a number average molecular weight of 150 g/mol to 150,000 g/mol, more preferably 1,000 g/mol to 100,000 g/mol, most preferably 2,000 g/mol to 20,000 g/mol. The weight average molecular weight can be determined in particular by gel permeation chromatography using polystyrene standards.

In addition to the polymers mentioned, the coating material preferably contains at least one solvent. This is preferably an organic solvent. The solvent can be polar or non-polar, for example. Suitable solvents are, for example, xylene, ethylbenzene, di-n-butyl ether, n- and/or tert-butyl acetate.

In a preferred embodiment, the coating material comprises a dispersion of particles, for example modified silicic acid esters or particles of one of the above-mentioned polymers. The average particle size is, for example, in the range from 0.01 μm to 200 μm, preferably 0.01 μm to 10 μm.

For processing in the method according to the invention, the coating material preferably has a viscosity of 2 mPa·s to 200 m Pa·s during application, particularly preferably 10 mPa·s to 150 mPa·s, most preferably 50 to 120 mPa·s. This refers to the viscosity at the respective processing temperature. The viscosity depends in particular on the solvent content and the processing temperature. Preferably, these parameters are selected so that the above-mentioned viscosity of the coating material is obtained.

In one embodiment, the coating material is cured after application. The curing can be carried out in particular thermally, for example by IR irradiation, and/or by UV irradiation.

In one embodiment, curing is carried out thermally, i.e. at elevated temperature, preferably at a temperature of 50° C. to 100° C. and a relative humidity of 10% to 80%. Particularly preferably, the temperature is 60° C. to 90° C., most preferably 75° C. to 85° C. The relative humidity is preferably 40% to 80%.

In a further embodiment, curing is carried out thermally by infrared irradiation (IR irradiation). Preferably, the cover layer is heated to a temperature of 50° C. to 100° C., especially preferably 60° C. to 90° C.

In a further embodiment, curing is carried out by UV irradiation. Preferably, UV light in the wavelength range from 100 nm to 380 nm is used. The radiation used may also contain shorter or longer wavelength components, provided that sufficient intensity is ensured in the specified wavelength range. UV curing can be performed, for example, by using a gas discharge lamp, in particular a mercury vapor lamp or a metal halide lamp with gallium-indium doping, iron doping or lead doping. Alternatively, UV curing can be carried out with an LED lamp.

In a particularly preferred embodiment, curing is performed by UV irradiation in combination with elevated temperature under the above conditions, in particular by UV irradiation in combination with IR irradiation.

A method in which curing is first carried out by IR irradiation and then by UV irradiation is particularly preferred. In particular, the cover layer is cured first by IR irradiation for 1 to 5 minutes and then by UV irradiation for 30 to 60 seconds. Under these conditions, the cover layer acquires excellent dirt-repellent properties while maintaining high transparency and mechanical stability.

After application and possible curing, the cover layer preferably has a thickness of 1 μm to 100 μm, particularly preferably 2 μm to 20 μm.

The decorative part described here comprises a substrate layer and a decorative layer applied to the substrate layer. This structure defines the visible side and the installation side of the decorative part. The visible side is the side on which the decorative surface of the decorative layer is visible. The installation side is the side opposite the visible side on which the usually flat substrate layer is applied.

The substrate layer is preferably formed from plastic, in particular thermosetting or thermoplastic plastic. Suitable materials for the substrate layer include urethane (TPU), polycarbonate (PC), acrylonitrile-butadiene-styrene (ABS), polyamide (PA), polypropylene (PP), styrene-acrylonitrile (SAN), styrene-maleic anhydride (SMA), polypropylene ether (PPE), polyphenylene oxide (PPO), or a mixture of several of these plastics. For example, blends of PC and ABS, blends of ABS and PA, or blends of PC and SAN are particularly suitable. Particularly preferably, the substrate layer comprises a blend of TPU with one or more other plastics, in particular one or more of the above-mentioned plastics.

The plastic of the substrate layer can include further additives. For example, the plastic may be reinforced with glass, carbon or natural fibers. Preferably, the plastic is a glass fiber-reinforced plastic. Furthermore, fillers, such as silica or carbon black, may be included. The substrate layer may be formed integrally with a substrate, preferably by injection molding a plastic material forming the substrate and the substrate layer. The substrate typically has at least one mounting protrusion projecting from its rear side, which may be formed by the plastic material forming the substrate or a fastener, such as a screw or bolt, attached to the substrate by overmolding.

The decorative layer can be formed, for example, by wood veneer, metal, paper, plastic or a fabric. Preferably, the wood veneer is a real wood veneer, preferably a precious wood veneer. The wood veneer can be joined on the installation side with an additional blind veneer, the decorative wood veneer and the blind veneer being joined, for example, by means of a fleece impregnated with phenol-melamine resin or a layer of glue. If the decorative layer is formed from a metal, aluminum, steel and copper are particularly suitable for this purpose. The metal is preferably thin sheet metal. The fabric used can be a textile fabric made of natural or synthetic fibers, glass, carbon, Kevlar fabric, metal or metallized fabric, or a mixed fabric made of several of the above-mentioned fabrics, which can be tightly or widely meshed and thus make the layer behind it visible, for example the substrate layer behind the decorative layer.

The thickness of the decorative layer is preferably in the range of 0.1 mm to 2 mm inclusive, particularly preferably 0.3 mm to 0.7 mm.

The decorative layer preferably has a hydrophilic surface to improve adhesion between the decorative layer and the further layers directly connected to the decorative layer. In addition, the decorative layer preferably has an open-pored surface in order to achieve a larger contact area between the decorative layer and the other layers directly bonded to the decorative layer.

In a preferred embodiment, the decorative layer is made of aluminum. Preferably, in this embodiment, the coating material is applied directly to the decorative layer of aluminum.

In one embodiment, the decorative part comprises an intermediate layer which is applied to the visible side of the decorative layer and to which the coating material is applied. Preferably, at least one intermediate layer made of a thermoplastic or thermosetting material is used. The thermoplastic material used is, for example, a polymethyl methacrylate-containing composition, and the thermosetting plastic used is, for example, a polyurethane-containing composition. The use of a polymethyl methacrylate-containing intermediate layer is particularly preferred. The intermediate layers are at least partially translucent to ensure visibility of the decorative layer. The intermediate layers can be colorless or colored.

Providing an intermediate layer, in particular a polymethyl methacrylate- or polyurethane-containing intermediate layer, improves the gloss properties of the cover layer and allows a high-gloss surface to be produced. In addition, the intermediate layer, in particular a polymethyl methacrylate- or polyurethane-containing intermediate layer, improves the adhesion as well as the mechanical stability of the cover layer.

The intermediate layer is particularly advantageous if the decorative layer is formed by wood veneer, paper, plastic or a fabric. If the decorative layer is formed by a metal, in particular aluminum, the intermediate layer can be dispensed with.

According to the invention, the decorative part is provided as a molded part comprising the substrate layer, the decorative layer and any intermediate layers, and the coating material is applied to the visible side of this molded part. The decorative part thus preferably already has its final shape. In this way, a subsequent molding step can be dispensed with. Preferably, no further shaping step takes place after the coating material has been applied.

To produce the decorative part, the decorative layer is preferably formed into a preform. The shape of this preform essentially corresponds to that of the subsequent decorative part. The preform is produced in a suitable press mold. Before, during or after this forming process, the decorative layer can be joined to the substrate layer.

The decorative layer and substrate layer are joined by methods known, in particular by a pressing or injection molding method. For example, the decorative layer can be pressed onto the substrate layer, with SMC (Sheet Molding Compound) or GMT (Glass-Mat-reinforced Thermo-plastic) in particular being used as the pressing method. Alternatively, the substrate layer can also be injection molded onto the decorative layer. It is also possible to inject the substrate layer using the reaction injection molding method.

In the case of an injection molding method, the decorative layer is preferably formed into a preform before being joined to the substrate layer, the shape of which essentially corresponds to the later decorative part. The substrate layer can then be injected onto the preform, wherein the preform serves as a die that dictates the final shape of the decorative part.

In the case of a pressing process, forming the decorative layer and joining it to the substrate layer can be carried out in a single step. For this purpose, the decorative layer and substrate layer are prepared in a flat, planar form and pressed together. Alternatively, the decorative layer can also be formed into a preform before being joined to the substrate layer. In order to enable the decorative layer and substrate layer to be pressed together, in this case the substrate layer is also preferably formed into a corresponding preform before joining.

In order to increase the adhesion between the decorative layer and the substrate layer, an adhesion promoter is preferably applied to the installation side of the decorative layer before it is joined to the substrate layer. The adhesion promoter is, for example, glue or a reactive hotmelt adhesive. This is particularly the case with a decorative layer made of metal. If the decorative layer is a wood veneer with a blind veneer on the installation side, a fleece impregnated with phenol-melamine resin or glue can also be placed on the installation side of the decorative layer.

If an intermediate layer, in particular a polymethyl methacrylate or polyurethane-containing intermediate layer, is applied to the decorative layer, this is preferably done after the decorative layer has been formed. The intermediate layer can be applied by injection molding, for example. The intermediate layer can thus be applied directly to the preformed decorative layer and does not have to be subsequently formed again. The cover layer is then applied to the intermediate layer without the cover layer having to be deformed again.

The intermediate layer is preferably applied together with the cover layer in a clean room. Preferably, the intermediate layer is applied by injection molding. Preferably, the molded part coated with the intermediate layer is removed from the injection mold by means of a robot arm and coated directly with the coating material using the method described above. The cover layer thus produced is preferably cured inside the clean room as described above and then discharged from the clean room.

What is claimed is:

1. Method for producing a decorative part with a cover layer, the method comprising the following steps:

providing a molded part having an installation side and a visible side, wherein the molded part comprises a substrate layer on the installation side and a decorative layer on the visible side;

providing an intermediate layer applied to the visible side of the decorative layer; and applying a coating material to the visible side of the molded part to form the cover layer, wherein the coating material is applied by a print head.

2. Method according to claim 1, wherein the print head generates a coating material jet for applying the coating material.

3. Method according to claim 2, wherein the print head generates a droplet jet of the coating material.

4. Method according to claim 3, wherein the print head has a piezoelectric device for generating a droplet jet by a drop-on-demand method and has 2 to 6000 nozzles and generates a droplet jet with an average droplet volume of 1 pl to 300 pl and a droplet rate of 1 kHz to 200 kHz.

5. Method according to claim 1, wherein the print head and/or the molded part are each attached to a movable robot arm during application of the coating material and are moved relative to one another.

6. Method according to claim 1, wherein at least one print head is used which operates in a multi-pass process, or in that a plurality of print heads are used which each operate in a single-pass process.

7. Method according to claim 1, wherein a plurality of print heads is used, and a three-dimensional arrangement of the plurality of print heads is adapted to the geometry of the molded part.

8. Method according to claim 1, wherein the coating material comprises polysilazane and/or polysiloxane.

9. Method according to claim 1, wherein the coating material has a viscosity of 2 mPa·s to 200 mPa·s during application.

10. Method according to claim 1, wherein the cover layer is cured thermally and/or by UV irradiation after application.

11. Method according to claim 1, wherein the decorative layer is formed by wood veneer, metal, paper or a fabric.

12. Method according to claim 1, wherein the intermediate layer comprises polymethyl methacrylate and/or polycarbonate.

13. Method according to claim 1, wherein the intermediate layer is applied by injection molding, wherein the application of the intermediate layer is carried out together with the application of coating material in a clean room and the coating material is applied to the intermediate layer immediately after the injection molding.

14. Method according to claim 1, wherein the coating material comprises polysilazane and/or Polysiloxane and the intermediate layer comprises polymethyl methacrylate and/or polycarbonate.

15. Method according to claim 14, wherein the intermediate layer is applied by injection molding.

16. Method for producing a decorative part with a cover layer comprising the following steps:

providing a molded part having an installation side and a visible side, wherein the molded part comprises a substrate layer on the installation side, a decorative layer on the visible side, providing an intermediate layer applied to the visible side of the decorative layer; and using a print head to apply a coating material to the decorative layer on the visible side of the molded part to form the cover layer, which cover layer forms the outer surface of the molded part on the visible side.

17. Method for producing a decorative part with a cover layer according to claim 16 wherein:

the print head comprises a piezoelectric device.

18. Method for producing a decorative part with a cover layer according to claim 17 wherein:

the print head generates a droplet jet of the coating material with an average droplet volume of 1 pl to 300 pl and a droplet rate of 1 kHz to 200 kHz and has 2 to 6000 nozzles.

19. A method for producing a molded decorative part comprising the steps of:

forming a decorative layer into a preform with a shape corresponding to the molded decorative part;

applying a substrate layer onto the preform by injection molding;

applying an intermediate layer to the decorative layer by injection molding;

printing a coating material on the intermediate layer with a print head forming targeted jets of the coating material forming a cover layer; and curing the cover layer, whereby a cover layer is capable of being formed from the coating material that is not suitable for processing by injection molding.

* * * * *